H. B. McKINNEY.
AUTOMATIC WATERING DEVICE FOR STOCK.
APPLICATION FILED DEC. 19, 1908.
946,802.
Patented Jan. 18, 1910.
2 SHEETS—SHEET 1.
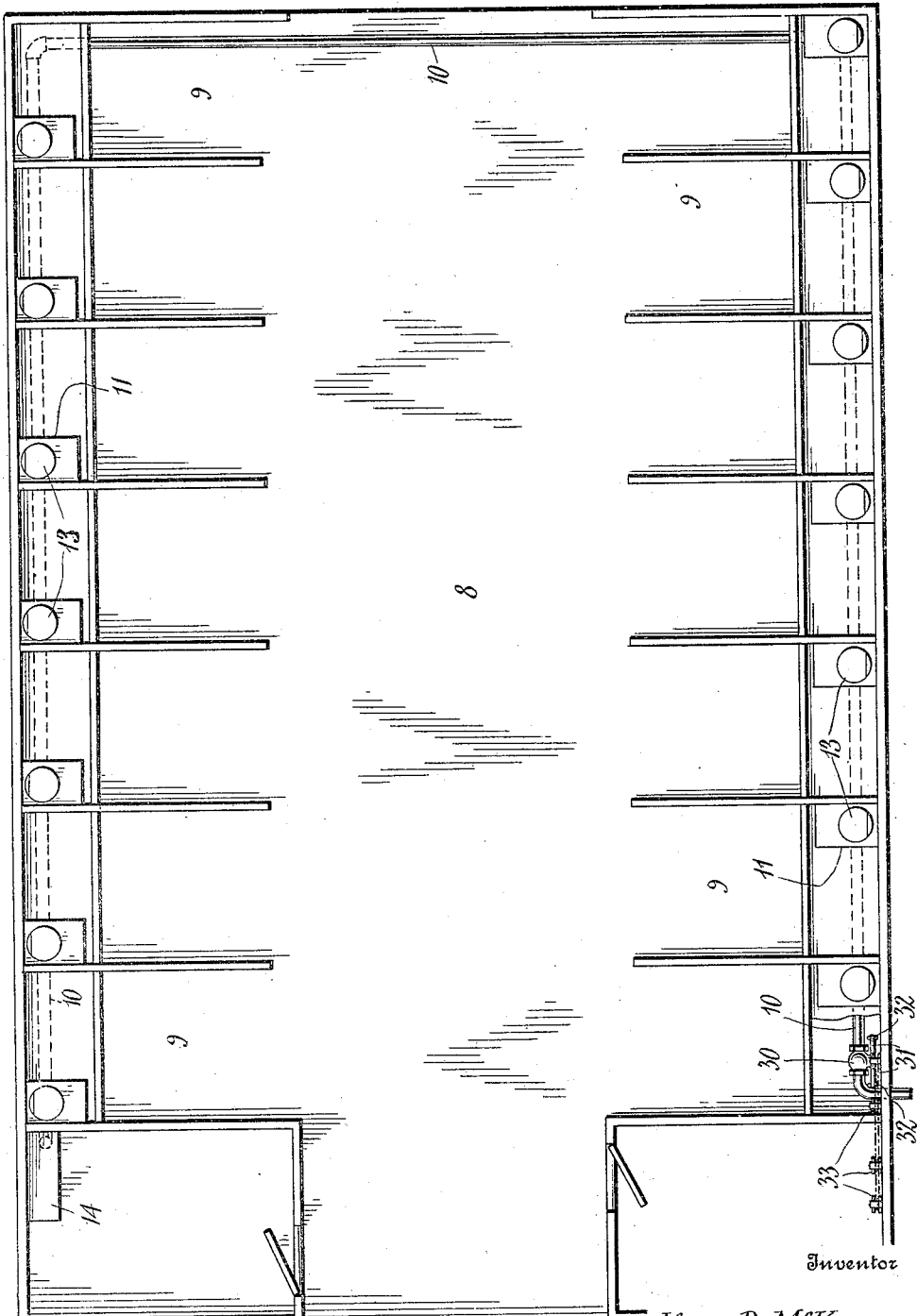

H. B. McKINNEY.
AUTOMATIC WATERING DEVICE FOR STOCK.
APPLICATION FILED DEC. 19, 1908.
946,802.
Patented Jan. 18, 1910.
2 SHEETS—SHEET 2.
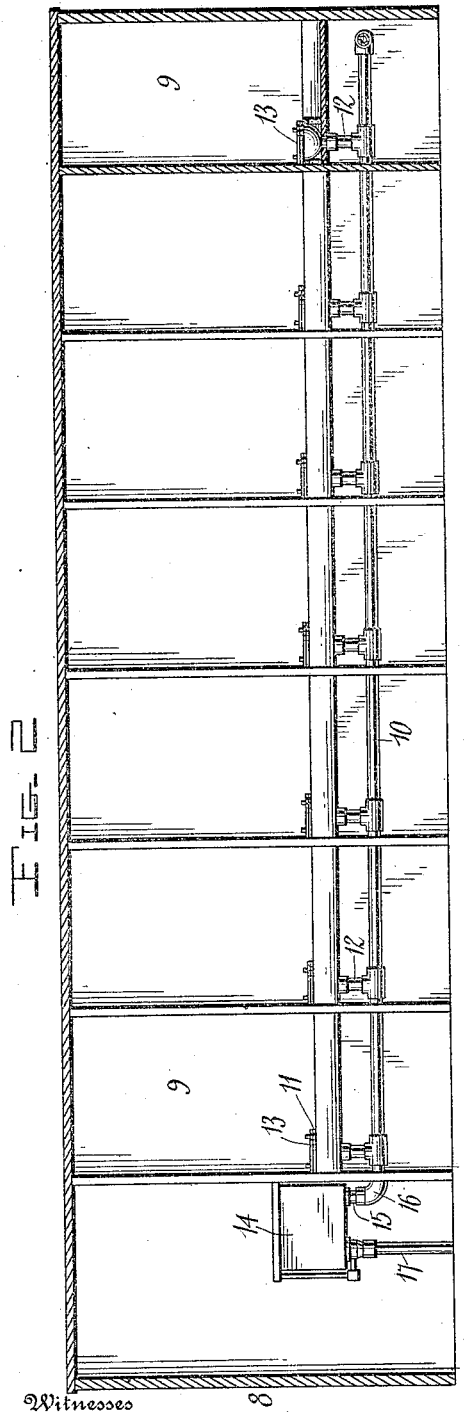
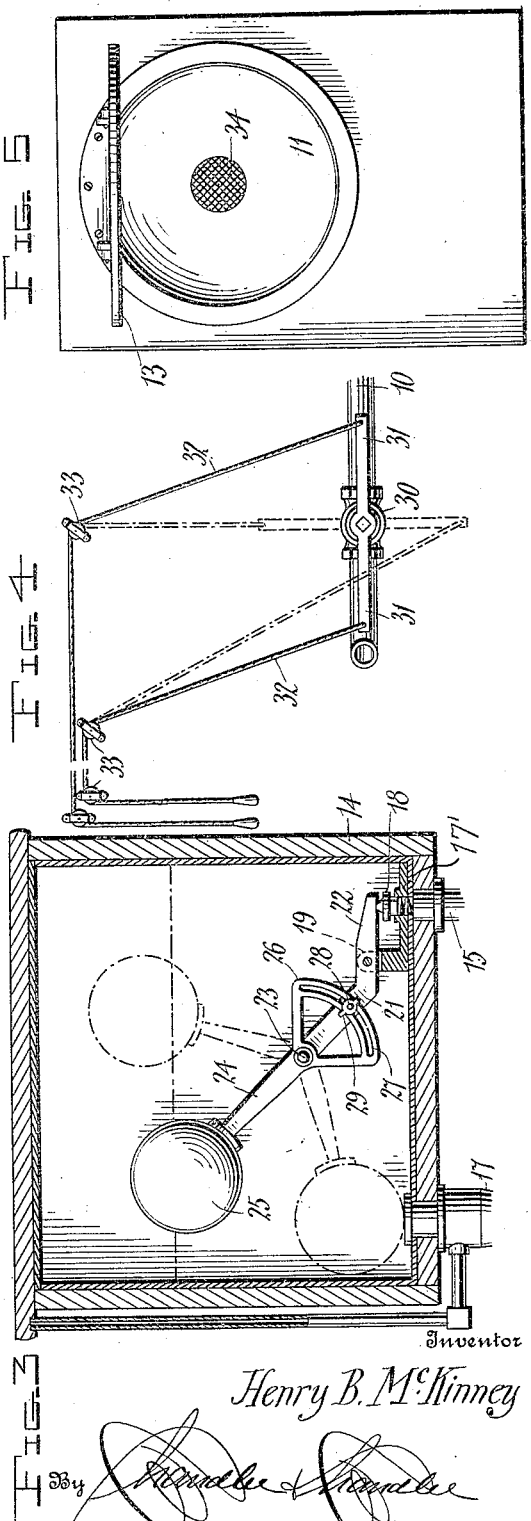

UNITED STATES PATENT OFFICE.

HENRY BOWDEN McKINNEY, OF EVANSVILLE, INDIANA.

AUTOMATIC WATERING DEVICE FOR STOCK.

946,802.          Specification of Letters Patent.    Patented Jan. 18, 1910.

Application filed December 19, 1908. Serial No. 468,385.

*To all whom it may concern:*

Be it known that I, HENRY B. McKINNEY, a citizen of the United States, residing at Evansville, in the county of Vanderburg, State of Indiana, have invented certain new and useful Improvements in Automatic Watering Devices for Stock; and I do hereby declare the following to be a full, clear, and exact description of the invention, such as will enable others skilled in the art to which it appertains to make and use the same.

The invention relates to a watering device for stock and more particularly to the class of automatic watering devices for supplying drinking water to horses, cattle or other animals.

The primary object of the invention is the provision of an automatic watering device which comprises one or a plurality of individual watering receptacles or troughs arranged in series and means for automatically supplying water simultaneously to a receptacle or receptacles or troughs at a predetermined level therein, whereby animals may be separately provided with a continuous supply of water in stalls respectively of a stable, barn, field, stock yards and stock cars.

Another object of the invention is the provision of an automatic watering device for stock which comprises individual watering troughs arranged in series and having communication with a supply pipe, a water tank or reservoir in communication with the supply pipe, float means arranged within the water tank or reservoir to control the supply of water communicated to the water troughs or receptacles and to maintain automatically a uniform or predetermined level of water in the said trough or receptacle at all times, and means to permit the flushing of the water troughs or receptacles as the occasion may demand.

A further object of the invention is the provision of an automatic watering device for stock in which there is arranged within a stall or a series of stalls, water supply means whereby animals may be separately provided with a continuous supply of water, adjustable float means for controlling the water supply and to permit the water to reach a predetermined level within the water supply means and arranged within the stalls and means for flushing the water supply means to maintain the same in sanitary condition.

In the drawings accompanying and forming part of this specification is illustrated the preferred form of embodiment of the invention which to enable those skilled in the art to practice the invention, will be set forth at length in the following description while the novelty of the invention will be brought out in the claim succeeding the description. It is of course to be understood that changes, variations and modifications may be made, such as come properly within the scope of the appended claim, without departing from the spirit of the invention.

In the drawings: Figure 1 is a top plan view of a series of stalls with the invention applied thereto. Fig. 2 is a vertical sectional view through a series of the stalls, showing the water troughs and reservoir in side elevation. Fig. 3 is a vertical sectional view of a water tank showing in detail the adjustable float for controlling the water supply therefrom. Fig. 4 is a side elevation of the means including an opening and closing valve, permitting the flushing of the water troughs and the means for operating the same. Fig. 5 is a top plan view of one of the watering troughs with its cover in elevated position.

Similar reference characters indicate corresponding parts throughout the several views in the drawings.

In the drawings the numeral 8 designates a stable, barn or the like having arranged at opposite sides within the same rows of stalls 9 through which passes a continuous water supply pipe 10 the latter horizontally supported near the closed ends of the stalls. Arranged within each stall above the water supply pipe 10 is a water trough or basin 11, the latter having communication with said water supply pipe through a short pipe coupling 12 and which basin is provided with a hinged cover 13 so that the basin can be closed when not in use.

Mounted upon one side wall of the stable 8 on a level with the water troughs or basins 11 is a water tank 14 which latter is disposed at one terminal of the water supply pipe 10 and has communication therewith through a feed pipe 15 leading from said tank and coupled with the terminal of the water supply pipe.

Below the point of communication of the feed pipe 15 with the water tank 14 is arranged a coupling 16 forming a water tight joint between the supply and feed pipes. Leading into the water tank 14 is a main water supply pipe 17 which latter is adapted to supply water to the said tank from any suitable source of water supply. Arranged at the terminal of the water supply pipe 17 communicating with the tank 14 is a cut off lift valve 18, which latter is automatically lifted by the usual expansion spring. The valve is mounted in a socket formed in a casting 17' fixed to the bottom of the tank. Rising from the casting in the tank 14 are spaced ears 19 to which is pivoted as at 20 an angle-shaped arm 21 the latter having an extension 22 overhanging the said lift valve 18 to control the movement of the same. Connected to the arm 21 by a pivot 23 is an adjustable arm 24 carrying at its free end a ball float 25 and which pivoted end of the said arm 24 is formed with a segment 26 containing a curved elongated slot 27 in which works a bolt fastener 28 carried by the arm 21 and which bolt fastener carries a thumb nut 29 for locking the ball float 25 in various adjusted positions within the tank. It is obvious that by adjusting the ball float 25 it will permit a predetermined amount of water to enter the tank 14 before the lift valve 18 will be effected by the extension 22 to shut off the supply of water thereto from the main water supply pipe. The ball float 25 within the water tank 14 will also control the water supply to the water tanks or basins 11 in the stalls respectively and permit the water to reach a predetermined level therein.

At the outlet terminal of the water supply pipe 10 is arranged an opening and closing valve 30 which latter is formed with oppositely disposed extensions or arms 31 to the ends of which are connected flexible cables 32 which latter are trained over pulleys 33 and are adapted to be actuated by a person to bring the said valve 30 into an open or closed position. When the valve 30 is thrown to an open position it will cause the flushing of the water troughs or basins so as to clean the same to maintain them in sanitary condition. Within each of said water troughs or basins 11 at the bottom thereof is disposed a perforated drain plate or screen 34 so as to prevent straw or other foreign matter from entering the water supply pipe 10 which would result in the clogging or stopping up of the said pipe.

What is claimed is—

A device of the class described comprising a plurality of water troughs arranged in spaced relation and in the same plane with each other, a water supply tank, a water supply pipe in communication with the troughs and the tank, a casting mounted on the bottom of the trough and having a valve socket in communication with the supply pipe, a valve loosely fitted in said socket, a spring beneath the valve to automatically lift the same, spaced ears rising from the casting at one side of the valve, an angle-shaped arm pivoted intermediate its ends between the ears and having one extremity overlying the valve, an adjustable arm pivoted intermediate its ends to the other extremity of the angle-shaped arm, a slotted segment formed at the inner end of the adjustable arm, a fastener engaged in the slot of the segment to lock the latter in adjusted position on the angle-shaped arm, and a ball float on the outer end of the adjustable arm.

In testimony whereof, I affix my signature, in presence of two witnesses.

HENRY BOWDEN McKINNEY.

Witnesses:
   WILLIAM L. BROWN,
   DAVID W. MEDCALF.